Oct. 30, 1956  E. OBERMAIER  2,769,138
D. C. CONVERTER CIRCUITS
Filed April 25, 1951  2 Sheets-Sheet 1

INVENTOR.
Edward Obermaier
BY
Robert H. Wendt
Atty.

Oct. 30, 1956　　　　E. OBERMAIER　　　　2,769,138
D. C. CONVERTER CIRCUITS
Filed April 25, 1951　　　　　　　　　　　　　　2 Sheets-Sheet 2

INVENTOR.
Edward Obermaier
BY
Robert H. Wendt
Atty.

United States Patent Office 2,769,138
Patented Oct. 30, 1956

2,769,138

D. C. CONVERTER CIRCUITS

Edward Obermaier, Chicago, Ill., assignor to Illinois Testing Laboratories, Inc., Chicago, Ill., a corporation of Illinois Application April 25, 1951, Serial No. 222,803

1 Claim. (Cl. 323—89)

The present invention relates to D. C. converter circuits, and is particularly concerned with an improved circuit and apparatus for converting small D. C. currents into A. C. voltages.

One of the objects of the invention is the provision of an improved circuit employing core reactors for the purpose of converting small D. C. currents into A. C. voltages so that the relatively small signals produced by thermocouples or similar devices may be converted into A. C. voltages and amplified to an amount capable of actuating two-phase motors or other controlling devices.

Another object of the invention is the provision of a very sensitive circuit adapted to be controlled by small D. C. currents having a large conversion factor.

Another object of the invention is the provision of an improved D. C. converter circuit which may be used as a sensitive low impedance micro-ammeter or to operate a two-phase motor driving the pen mechanism of a temperature recording controller, responsive to the electromotive forces generated by a thermocouple.

Other objects and advantages of the invention will be apparent from the following description and the accompanying drawings, in which similar characters of reference indicate similar parts throughout the several views.

Referring to the two sheets of drawings accompanying this specification,

Figure 1:
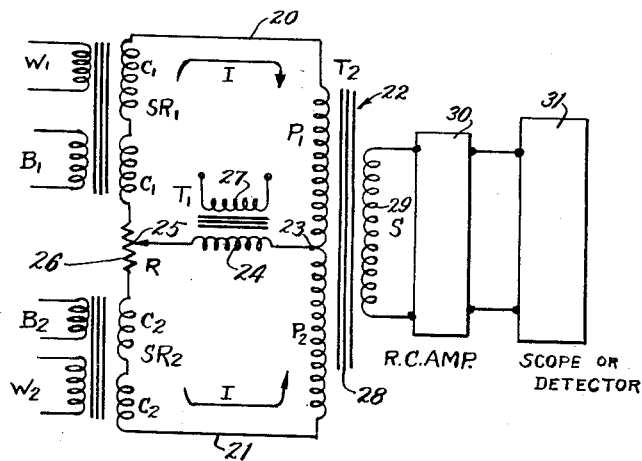
Fig. 1 is a simplified wiring diagram of one form of the circuit.
Figure 2:
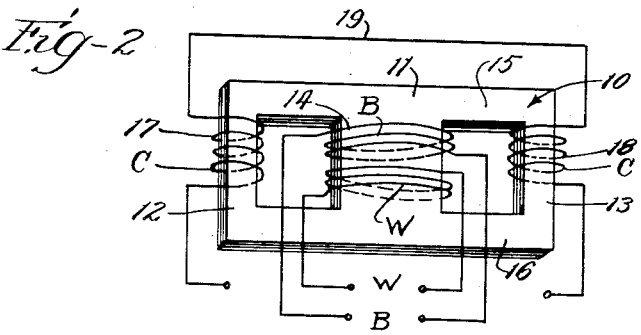
Fig. 2 is a diagram showing the circuit connections and arrangement of the coils for one of the core reactors.

Referring to Figs. 1 and 2, the converter circuit includes two small Mu-metal saturable reactors of the type shown at 10 in Fig. 2. These reactors are provided with a core 11 of Mu-metal, consisting of a multiplicity of laminations, the core being closed and having a pair of lateral legs 12, 13, the sum of the cross-sectional areas of which is equal to the cross-sectional area of the central leg 14.

The upper and lower joining portions 15 and 16 of this core are preferably of equal cross-sectional area; and they join the legs 12 and 13 to the central leg 14. The outer legs 12 and 13 are provided with a pair of identical coils 17, 18, also indicated by the letter C, connected in series aiding each other.

The series connecting conductor is indicated at 19; and the direction of winding of these coils is such that both coils tend to cause flux in the same direction at the same time, opposing each other in flux, so that no flux passes through the central leg 14.

The two reactors themselves are as nearly alike as physically possible; and the identical coils C have the same size and resistance wire, with the same insulation, same number of turns, and same distribution of turns on the legs 12 and 13. The central leg of each reactor also has a control coil W and a bias coil B wound upon it; and these coils are wound in the same direction and preferably both distributed over the length of the central leg 14.

Referring now to Fig. 1, the two saturable core reactors of this circuit are indicated as $SR_1$ and $SR_2$; and each includes its coils $C_1$ and $C_2$, respectively. The control windings and bias windings of the central legs of each reactor are indicated by $W_1$, $B_1$, $W_2$, and $B_2$, respectively.

The windings $C_1$ and $C_2$ of the two reactors are connected in series through a resistance R, which serves as a substantial potentiometer, whose function it is to correct for the small differences in impedance of the reactors $SR_1$ and $SR_2$. The other terminals of the coils $C_1$ and $C_2$ are connected by conductors 20, 21 to the terminals of the primary of an output transformer 22, also indicated as $T_2$.

The primary of this transformer comprises two equal sections $P_1$ and $P_2$, with a center tap 23, which is connected to the secondary 24 of an energizing transformer. The other terminal of this secondary is connected to the adjustable contact 25 of the resistance R, also indicated at 26.

The primary of the transformer $T_1$ is indicated at 27; and its terminals are connected to line voltage, such as a 60 cycle, 110 volt circuit, but any suitable frequency and voltage may be employed, that mentioned being merely the most convenient.

The transformer $T_2$ is specially constructed, with the balanced primary windings $P_1$ and $P_2$ located and distributed symmetrically upon its core 28 with respect to the secondary 29. The secondary may have its terminals connected to the input of an R. C. amplifier 30, the output terminals of which may be connected to the input of an oscilloscope or detector 31.

The mode of operation of this circuit is as follows: The primary 27 of transformer $T_1$ is connected to A. C. line voltage, thus energizing the outer leg coils $C_1$, $C_2$ of the core reactors and the primaries $P_1$ and $P_2$ of the output transformer 22.

The potentiometer 26 is then so adjusted that the currents which flow in both branches of the circuit are equal; and this condition is indicated by zero current in the secondary of the output transformer 22.

The flux in each primary of the output transformer $T_2$ is indicated by the letter $\phi$ and the flux due to each primary is oppositely directed. The net flux is, of course, zero, as indicated by the diagram in Fig. 3, by the horizontal coordinate. No voltage will then occur across the secondary of the output transformer 22.

If a small D. C. voltage is now applied to the control coil $W_1$ of $SR_1$, then in accordance with a fundamental property of a saturable core reactor, the impedance of $SR_1$ will decrease. As a result, the current which flows through primary $P_1$ will increase, which will increase the flux due to $P_1$ to an amount which may be indicated as $\phi_1$.

Figure 3:
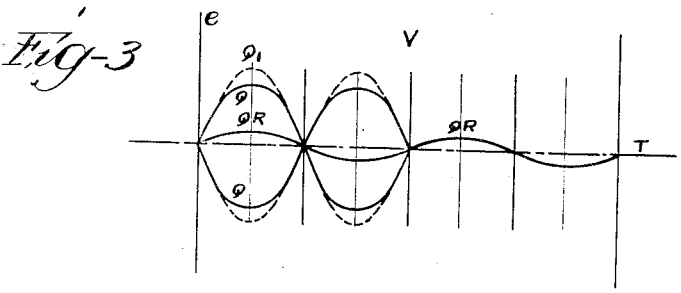
Fig. 3 is a diagram showing the wave forms resulting from various modes of excitation of the core reactors.

The fluxes due to the primary windings of the output transformer $T_2$ are now unequal; and the net resultant unbalanced flux may be indicated as $\phi_R$, and may be illustrated in the diagram of Fig. 3 by the small wavy line.

The resultant unbalanced flux $\phi_R$ in $P_1$ will, therefore, cause a voltage $V_R$ across the secondary S of the output transformer 22.

This voltage will have the same frequency as the line voltage applied to the energizing transformer $T_1$ and will also have a sine wave form. It can, therefore, be amplified very easily by a simple R. C. amplifier to any degree desired.

If a small D. C. voltage is applied to the control coil $W_2$ of core reactor $SR_2$, instead of $W_1$ of $SR_1$, the result will be just as described, with the exception that voltage occurring across the secondary S of output transformer $T_2$ will be 180 degrees out of phase with that which was produced by excitation of $W_1$ and $SR_1$.

It follows that if equal ampere turns are applied to $W_1$ and $W_2$ simultaneously, no voltage will appear at the secondary S of the output transformer.

In order to obtain the greatest possible voltage output across the secondary S of the output transformer for a given input signal both reactors are preferably biased by energization of the bias coils $B_1$ and $B_2$ by a small equal amount of D. C.; and the control coils $W_1$ and $W_2$ are preferably connected in the manner shown in Fig. 4, in series with each other, and connected to a predetermined D. C. input voltage.

The bias placed on the reactors by energizing coils $B_1$ and $B_2$ should produce no voltage across the output secondary S.

Figure 4:
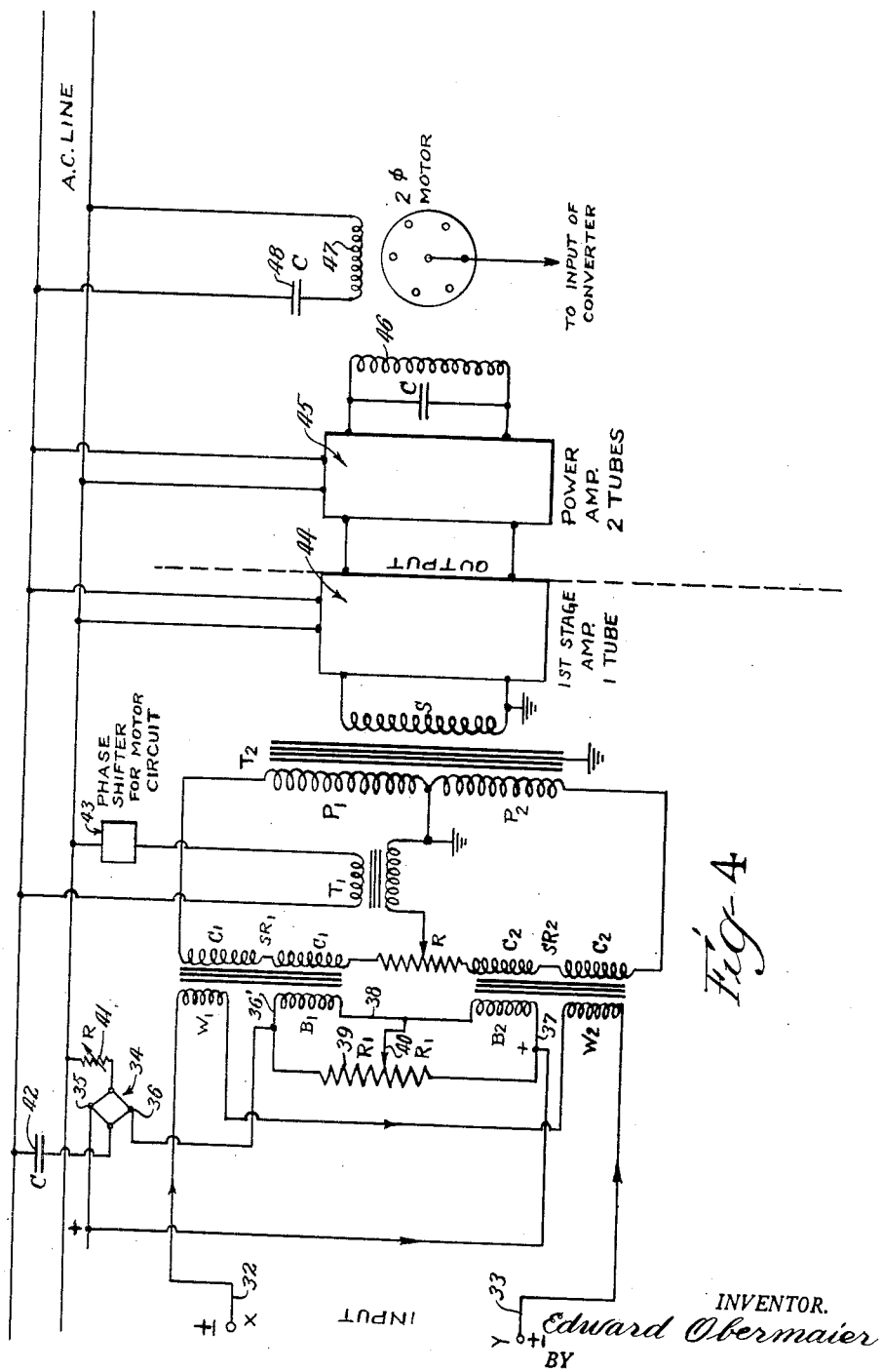
Fig. 4 is a wiring diagram of the complete circuit, which may be employed for controlling a two-phase motor.

Referring to Fig. 4, this is a circuit showing one of the practical applications of the converter; and the D. C. input terminals 32, 33, also indicated as X and Y, may be either positive or negative, as indicated.

When the point X of the input circuit is positive, the ampere turns of control $W_1$ will aid those of bias coil $B_1$ and the ampere turns of control coil $W_2$ will decrease those of bias coil $B_2$.

The net result will be a decrease in impedance of reactor $SR_1$ and an increase in impedance of reactor $SR_2$. When the point Y is positive, the behavior of the circuit is exactly the reverse of that just described. The increase in impedance of $SR_2$ and decrease in $SR_1$, which occur simultaneously, produces the greatest voltage change, and vice versa.

Referring again to Fig. 4, the two bias coils $B_1$ and $B_2$ are preferably energized with D. C. produced from the A. C. line by using a rectifier 34, the D. C. terminals 35 and 36 of which are connected to the terminal conductors 36' and 37 of the bias coils, which are connected in series aiding by conductor 38.

The terminal conductors 36', 37 of the bias coils are also connected through a balancing resistance 39, also indicated as $R_1$; and the conductor 38 between the bias coils is connected to an adjustable contact 40 so that the resistance 39 may serve as a balancing potentiometer for securing equal bias.

The input terminals of the rectifier 34 are connected to line through an adjustable resistance 41 and a condenser 42 for reducing the voltage to the rectifier. This condenser may be eliminated by using the filament transformer in the R. C. amplifier.

The excitation transformer has its primary $T_1$ connected to the A. C. line through a phase shifter 43 for the motor circuit.

The rest of the circuit of Fig. 4 is substantially the same as that of Fig. 1, except that the types of the amplifiers are further indicated as being one tube in the first stage 44 and two tube in the second stage or power amplifier 45. The output of the power amplifier 45 is connected to one of the coils 46 of the two phase motor; and the other coil 47 of the two phase motor is connected to the A. C. line through a condenser 48.

The shaft of the two phase motor is connected to a suitable rheostat to adjust the input of the present converter so that the input of a direct current will cause the actuation of the two phase motor to produce an adjustment in which the circuit conditions are again balanced.

The sensitivity of the present circuit is such that if 60 microvolts are applied across the input terminals, which has an impedance of 20 ohms, an output of 3 to 5 volts may be expected across the first stage of the amplifier. This corresponds to an input power of $1.8 \times 10^{-10}$ watts. Since the gain of this stage is approximately 100, the conversion factor, that is, the change from D. C. to A. C., is around 500–800.

The present converter may have a great many uses and applications. For example, it can be used as a sensitive low impedance microammeter or it may be used to operate a two phase motor which drives the pen mechanism of a temperature recording controller merely by adapting the output circuit to the specific requirements of such a recording controller.

It will thus be observed that I have invented an improved D. C. converter which is extremely sensitive, and which is simple in construction. The relatively small electromotive forces generated by thermocouples or the like may be converted into A. C. and amplified to control various other devices.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

In a D. C. converter circuit, a pair of identical core reactors, each core reactor having a central leg joining the ends of two lateral legs and equal in cross-section to the sum of the cross-sections of said lateral legs, each of said lateral legs of each core reactor having an A. C. winding, and the windings of each reactor being identical in series flux generating relation in said outer legs, and the windings of both core reactors being connected in series through an intermediate resistance, a pair of identical D. C. biasing coils, one being arranged on each of the center legs of said core reactors, a pair of D. C. control coils, the said D. C. control coils being arranged in series with each other, and one of each of said D. C. control coils being located on each of the central legs, an auto-transformer having a mid-point tap in its primary winding, the said primary windings being wound to oppose each other in flux on the same core, a ground and an energizing secondary winding of an energizing transformer connected to said center tap, the other end of said energizing secondary winding being connected to an adjustable contact engaging a balance point of said intermediate resistance, a primary winding on said energizing transformer connected to an A. C. line, a secondary on said auto-transformer serving as an output winding, said circuit being in a state of balance when energized and having zero current in the output winding under this condition, a D. C. signal impressed on said control coils producing an amplified A. C. signal at the secondary of said output transformer.

References Cited in the file of this patent

UNITED STATES PATENTS

| | | |
|---|---|---|
| 1,844,704 | Thompson | Feb. 9, 1932 |
| 1,955,322 | Brown | Apr. 17, 1934 |
| 2,450,286 | Livingston | Sept. 28, 1948 |
| 2,472,980 | Miller et al. | June 14, 1949 |
| 2,503,039 | Glass | Apr. 4, 1950 |
| 2,529,450 | Hornfeck | Nov. 7, 1950 |
| 2,531,211 | Glass | Nov. 21, 1950 |
| 2,548,049 | Olson | Apr. 10, 1951 |
| 2,552,203 | Morgan | May 8, 1951 |
| 2,552,952 | Gachet et al. | May 15, 1951 |
| 2,567,725 | Morgan | Sept. 11, 1951 |

FOREIGN PATENTS

| | | |
|---|---|---|
| 953,561 | France | May 23, 1949 |